E. LANHOFFER.
PROCESS FOR MOLDING SHEETS OF FIBROUS MATERIALS.
APPLICATION FILED MAR. 25, 1913.
1,154,256.
Patented Sept. 21, 1915.
Fig. 1
Fig. 2
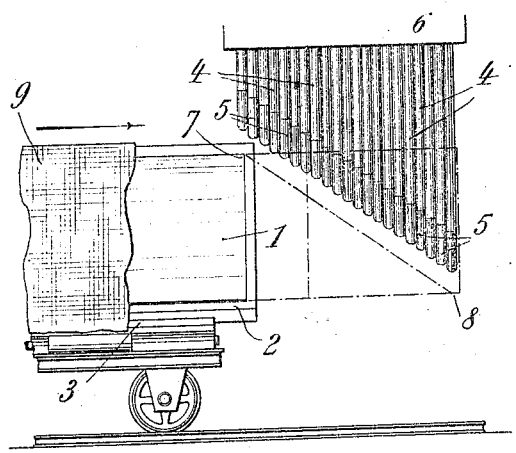
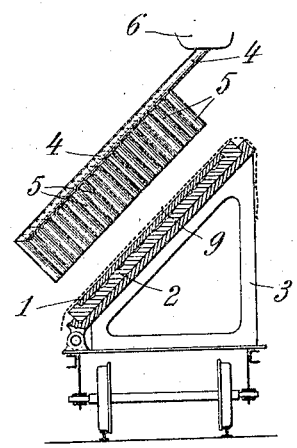
Witnesses:—
Hyperion Barry.
F. George Barry.
Inventor:—
Edmond Lanhoffer
by his attorneys

UNITED STATES PATENT OFFICE.

EDMOND LANHOFFER, OF POISSY, FRANCE.

PROCESS FOR MOLDING SHEETS OF FIBROUS MATERIAL.

1,154,258.

Specification of Letters Patent.  Patented Sept. 21, 1915.

Application filed March 25, 1913. Serial No. 756,834.

*To all whom it may concern:*

Be it known that I, EDMOND LANHOFFER, citizen of the Republic of France, and resident of No. 2 Boulevardde Maisons, Poissy, in the Department of Seine and Oise, in the said Republic, engineer, have invented a new and useful Process for Pressing and Molding Layers or Sheets of Fibrous Agglomerated Materials, of which the following is a specification.

Certain kinds of carton pierre composed of fibrous materials and of hydraulic cement or other agglomerants, before the setting of the agglomerants, are capable of being impressed or embossed in a more or less pronounced manner in order to produce a decorative or other effect. The methods actually employed for this purpose give good results when only very slight reliefs are required, but where such reliefs are required to exceed a certain degree, the material, according to the nature thereof, tears or breaks and necessitates costly retouching operations which, however carefully they may be accomplished, never equal the direct impress of the mold. Further the production of a matrix and of a counter-matrix or die capable of allowing for exact displacements of the material required for the production of the relief design to be produced and permitting uniform compression to be obtained when the plate or sheet is pressed into all the details of the matrix, is a lengthy and costly proceeding which is almost impossible to carry out to perfection.

According to the present invention, in order to obtain with the same materials more striking reliefs and to considerably simplify the question of the matrices an attempt is made to discover a method of pressing which requires no counter matrix and is capable of distributing and causing the material to penetrate into all the details of the mold as well as of closing any tears which may be produced.

The improved method consists in ramming or pressing the material into a matrix in which the plate, sheet or layer is placed by means of shocks exercised at all points of such sheet or layer by solid or liquid bodies possessing a suitable active force and projected in the form of a shower against the sheet or layer. For example, it is possible to employ jets of water under pressure or small solid bodies, such as balls, falling from a certain height.

The effect of the first shocks is to apply the sheet or layer to the relief portions of the mold and to pound or crush the material upon them so that the material is forced into the hollows. These latter thus receive the surplus material which is necessary for closing the breaks or rents which inevitably follow the extension to which the material is subjected in order that it may be applied to the hollow parts. Once the material reposes upon the hollow portions of the mold the active force of the bodies which strike it exerts upon it a ramming or beating which causes it to extend in all directions and closes all the breaks or rents at the same time that it forces the material to penetrate into all the details of the mold.

The material can be placed upon the matrix either in the form of a plane plate or sheet prepared in advance and still damp or plastic or in the form of a similar plate or sheet upon which additional fibrous material has been projected or distributed or spread, or in the form of fibrous material not formed as a plate or sheet and only simply projected or distributed or spread upon a fabric, or again in the form of a simple layer of material spread or projected directly upon the matrix. In short the layer of fibrous material can be in any form whatever.

It is advantageous to give to the matrix and to the sheet or layer which covers it a decidedly inclined position in order that the bodies which serve for striking the sheet do not remain in the hollows which they have produced and that they shall not produce by reason of their weight a certain rolling of the sheet.

Rather than operate at the same time over the whole of the surface of the sheet it is preferable to work in successive and parallel zones while the sheet with its mold is given a continuous and regular movement at a convenient speed before the nozzles projecting the solid or liquid bodies. In this way folds and wrinkles are avoided which result from the extension of the material produced by the shocks. Moreover this permits of having an apparatus of smaller dimensions because if the sheet receives a longitudinal movement the width given to the apparatus is only determined by the height of the sheet, the length of the sheet being immaterial. The nozzles for projecting the bodies are normal or almost normal to the surface of the sheet to be pressed and it is possible to have a single range or several ranges conveniently fed by one or several reservoirs.

When employing water for carrying out the method the nozzles are generally horizontal and are given an alternating rectilinear movement, or a circular movement in such a manner that not a single point escapes the action of the jets.

Figures 1 and 2 of the accompanying drawings are a side elevation and an end view partly in cross section respectively illustrating diagrammatically one mode of carrying out the process.

In the drawing 1 designates the sheet or layer of carton pierre to be pressed or stamped while still damp or plastic. This sheet or layer is placed upon the mold or matrix 2 carried in an inclined position upon the carriage 3 which is moved in front of a range of nozzles 5 connected by tubes 4 to a reservoir 6 containing, for example, solid bodies preferably in the form of balls which run down these tubes and through the nozzles 5 and are projected in a shower against the sheet or layer 1. In this example the orifices of the nozzles 5 are situated at graduated heights in such manner as to form an oblique line the extremities of which are situated respectively at the height of the upper edge and at the height of the lower edge of the sheet or layer in such manner that the latter is struck simultaneously by the balls over the whole of its width upon a line which is displaced parallel with itself upon the sheet or layer according to the travel of the carriage 3 in front of the apparatus. At the commencement of the operation the forward extremity of the sheet or layer is at 7, Fig. 1, and the upper angle only is struck by the balls. Then the line or zone of attack is gradually increased in length according to the advance of the sheet or layer and from the moment when the forward extremity of the sheet or layer arrives at 8 the said sheet or layer is operated upon over the whole of its width. Before the operation the sheet or layer may be covered with a fabric 9 which in certain cases may be an impermeable fabric.

As will be understood the carriage 3 instead of being in front of the nozzles can be arranged beneath; in this case the tubes 4, 5 would not need to be angularly disposed. Moreover the line of attack could be perpendicular to the length of the sheet or layer instead of being oblique. When water is employed for carrying out the process the nozzles are preferably horizontal and they are given a movement which is either a reciprocatory rectilinear movement or a circular movement in such manner that no point escapes the action of the jets.

What I claim is:—

1. Method of molding material in a matrix consisting in placing a layer of the material to be molded on said matrix, projecting a shower of relatively small bodies on to the exposed surface of said layer, collecting said bodies as they run down from said surface, and raising said bodies to a place from whence they may redescend on to said exposed surface.

2. Method of molding material in a matrix consisting in placing a layer of the material to be molded on said matrix, projecting a continuous shower of relatively small bodies on to a line extending from side to side of said layer, and moving said layer longitudinally during the operation of said shower.

3. Method of molding material in a matrix consisting in placing a layer of the material to be molded on said matrix, supporting said matrix and said layer in an inclined position and projecting a continuous shower of relatively small bodies on to the exposed surface of said layer in a direction about perpendicular to the plane containing said surface.

4. Method of molding material in a matrix consisting in placing a layer of the material to be molded in said matrix, projecting a continuous shower of relatively small bodies on to a line extending obliquely from side to side of said layer, and moving said layer continuously in the direction of its length during the operation of said shower.

5. Method of molding material in a matrix consisting in placing a layer of the material to be molded in said matrix, supporting said layer and said matrix in such a position that they are inclined from side to side, projecting a continuous shower of relatively small bodies on to the exposed surface of said layer over a line extending obliquely from side to side of said layer, said shower being arranged to fall about perpendicularly to the plane containing said surface, and moving said layer continuously in the direction of its length during the operation of said shower.

In testimony, that I claim the foregoing as my invention I have signed my name in presence of two witnesses, this twelfth day of March 1913.

EDMOND LANHOFFER.

Witnesses:
 LUCIEN MEMMINGER,
 ALCIDE FABRE.